United States Patent
Dörfler et al.

(10) Patent No.: US 11,795,977 B2
(45) Date of Patent: Oct. 24, 2023

(54) PUMP HOUSING, PUMP, AND SEAT

(71) Applicant: Alfmeier Präzision SE, Treuchtlingen (DE)

(72) Inventors: Erich Dörfler, Landsberg (DE); Ronny Gehlmann, Allersberg (DE); Helmut Auernhammer, Höttingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 16/841,778

(22) Filed: Apr. 7, 2020

(65) Prior Publication Data

US 2020/0324672 A1 Oct. 15, 2020

(30) Foreign Application Priority Data

Apr. 15, 2019 (DE) ...................... 10 2019 109 928.5

(51) Int. Cl.
*F04D 29/66* (2006.01)
*B60N 2/66* (2006.01)
*F04D 13/06* (2006.01)
*F04D 29/40* (2006.01)
(Continued)

(52) U.S. Cl.
CPC ........... *F04D 29/668* (2013.01); *F04D 13/06* (2013.01); *B60N 2/665* (2015.04); *F04D 29/406* (2013.01); *F04D 29/426* (2013.01); *F04D 29/628* (2013.01); *F04D 29/669* (2013.01)

(58) Field of Classification Search
CPC ........ B60N 2/5621; B60N 2/976; B60N 2/66; B60N 2/914; B60N 2/665; F04D 29/602; F04D 29/668; F04D 29/628; F04D 29/426; F04D 29/406; F04D 29/669; F04D 29/624; F04D 29/4206; F04D 29/403; F04D 25/06; F04B 39/0044; F04B 39/0027;
(Continued)

(56) References Cited

U.S. PATENT DOCUMENTS

| | | | |
|---|---|---|---|
| 4,406,592 A | * | 9/1983 | Kropiwnicki ......... F04B 39/127 248/560 |
| 5,017,100 A | | 5/1991 | Arkans |
| 5,092,338 A | | 3/1992 | Ide et al. |

(Continued)

FOREIGN PATENT DOCUMENTS

| | | | |
|---|---|---|---|
| CN | 203176006 U | | 9/2013 |
| CN | 108425871 A | * | 8/2018 |

(Continued)

OTHER PUBLICATIONS

GPTO Office Action dated Feb. 3, 2020 with English Translation.
(Continued)

*Primary Examiner* — Charles G Freay
(74) *Attorney, Agent, or Firm* — JK Intellectual Property Law, PA

(57) ABSTRACT

A pump housing may accommodate a pump unit and a pump motor, especially for a lumbar support function or massage function for mounting in a vehicle seat, wherein the pump motor and the pump unit are attached to one another along a longitudinal axis, and furthermore may support the pump motor with at least two flexible support elements in a radial direction and a second coil spring in an axial direction. Related pump and seat concepts are also disclosed.

12 Claims, 4 Drawing Sheets

(51) Int. Cl.
*F04D 29/42* (2006.01)
*F04D 29/62* (2006.01)

(58) Field of Classification Search
CPC ............ F04B 2201/0802; F04B 53/001; F04B 53/003; F04B 2203/0406
See application file for complete search history.

(56) References Cited

U.S. PATENT DOCUMENTS

| | | | |
|---|---|---|---|
| 5,311,625 A | | 5/1994 | Barker et al. |
| 5,533,704 A | * | 7/1996 | Fischinger ............ F04D 29/668 248/603 |
| 7,278,834 B2 | * | 10/2007 | Herrick ............... F04B 39/0044 417/363 |
| 2006/0292425 A1 | | 12/2006 | Suh et al. |
| 2013/0343926 A1 | * | 12/2013 | Wykman ................ B60N 2/914 417/363 |
| 2016/0087271 A1 | * | 3/2016 | Jarvis ................. E21B 41/0085 166/65.1 |
| 2018/0257534 A1 | * | 9/2018 | Mizoi .................... A47C 7/425 |
| 2018/0281253 A1 | * | 10/2018 | Kim ...................... F16K 17/044 |
| 2021/0276469 A1 | | 9/2021 | Sakai et al. |

FOREIGN PATENT DOCUMENTS

| | | | |
|---|---|---|---|
| CN | 208442034 U | | 1/2019 |
| CN | 109563823 A | | 4/2019 |
| DE | 10 2007 040 461 A1 | | 3/2009 |
| EP | 2654511 A1 | | 9/2015 |
| GB | 2242723 | | 10/1991 |
| JP | S60-6451 | | 1/1985 |
| WO | WO-2009030391 A1 | * | 3/2009 ........... F04D 29/669 |

OTHER PUBLICATIONS

Chinese Office Action for 202010272976.X, dated Sep. 15, 2021, with English Translation.
Chinese Office Action dated Apr. 28, 2022 for Application No. 202010272976.X; no English translation available.

* cited by examiner

PUMP HOUSING, PUMP, AND SEAT

CROSS-REFERENCE TO RELATED APPLICATIONS

This application claims benefit to German Patent Application Number 10 2019 109 928.5, filed Apr. 15, 2019, which is incorporated in its entirety by reference herein.

TECHNICAL FIELD

The disclosure relates to a pump housing, a pump, and a seat.

BACKGROUND

From EP 2 654 511, it is known that pump vibrations occurring outside a housing, especially when vehicle seats are used—which are especially disturbing to the user due to acoustics or the movement as such—can be reduced by springs arranged between the motor unit and housing. In this context, EP 2 654 511 envisages a planar spiral spring in axial direction of the motor. The pump suspension described is complex and has high production costs.

SUMMARY

A purpose of the disclosure is to specify a pump housing, a pump, and a seat that overcome the disadvantages according to the state of the art.

The disclosure solves this pump housing, pump, and seat problems through one or more elements of the disclosed subject matter as set forth below.

The pump housing according to the disclosure is suitable for accommodating a pump unit and a pump motor, especially for a lumbar support function or massage function for mounting in a vehicle seat, wherein the pump motor and pump unit are attached to one another along a longitudinal axis, furthermore suitable to support the pump motor with at least two flexible support elements in radial direction and with a second coil spring. Thus, the pump motor and pump unit are arranged along a motor shaft. The housing also includes a first passage for the pump outlet and a second passage for an electrical connection, which are expediently arranged on the same head side of the pump housing. A flexible support element can be especially a first coil spring or a damping element, particularly a damping element made of foam.

Expediently, the pump housing has one or several cylindrical protrusions to accommodate the first and/or second coil springs and/or one or several fixing elements to fasten the first and/or second coil springs. The pump housing has especially a cylindrical protrusion or fixing element on the longitudinal axis, particularly on a side opposite the first and second passage, especially arranged on an outer housing wall.

The fixing element or elements have a pocket-shaped design. They have especially a basic rectangular shape with a circular segmented mesh. The fixing elements or protrusions are expediently formed as single pieces with the pump housing, which can be made of metal or plastic.

The pump housing expediently includes two half shells, which are especially designed largely mirror symmetrically to one another. Here, half shells designed largely mirror symmetrically means that the peripheral edges of the half shells can be designed differently from each other. In particular, the edges can be designed as tongue and groove.

Alternately or additionally, the half shells can be attached to a sealing element. The half shells can also be formed as a one-piece plastic part with a hinge connection. The half shells can be especially attached to one another in an airtight and soundproof way.

The design also has additional damping elements on an inner side of the pump housing to prevent a collision between pump motor and pump housing. The damping elements can be especially arranged in a radial way and/or be made of a foam. In particular, additional damping elements can be thinner than the distance between pump housing and pump motor or pump unit.

The damping elements can extend cylindrically in or around the first and/or second coil spring.

Another design provides for two, four, six or eight first coil springs, which are especially equally spaced apart from one another in a circumferential direction.

The pump according to the disclosure, in particular for a lumbar support function or massage function for mounting in a vehicle seat, includes a pump housing according to the disclosure, a pump motor and a pump unit, wherein pump motor and pump unit are attached to one another along a longitudinal axis and accommodated in the pump housing, wherein at least two flexible support elements and a second coil spring are arranged in axial direction between the pump motor and the housing. The second coil spring, in particular, is arranged on a longitudinal axis of the pump. The pump according to the disclosure vibrates very little and can be produced economically. The pump can have two first coil springs as flexible support elements that radially support the pump motor and pump unit compound arrangement against the pump housing radial. Alternately, the pump can also have two damping elements as flexible support elements. In this case, the damping elements are executed as foam, for example, and can be high enough so each damping element makes simultaneous contact with the pump motor and pump unit compound arrangement and the pump housing.

Expediently, the coil springs are selected from a cylindrical coil compression spring, from a coil compression spring with optional end coils and an exposed coil compression spring with enlarged end coils.

The coil spring is especially a steel spring.

In the design, the pump motor ora ring element to be arranged around the pump motor has cylindrical protrusions to accommodate the coil springs and/or fixing elements to fasten the coil springs.

Additional damping elements to prevent a collision between pump motor and housing can be arranged on the pump motor and/or pump unit. In particular, additional damping elements can be thinner than the distance between pump housing and pump motor or pump unit or simultaneously touch the pump housing and pump motor or pump unit.

The seat according to the disclosure, especially a vehicle seat, has a pump according to the disclosure. One or several pumps can be especially arranged in a backrest of the seat and connected to a massage system or lumbar support system.

BRIEF DESCRIPTION OF THE DRAWINGS

The disclosure will now be explained in more detail with reference to the enclosed drawings, in which.

DETAILED DESCRIPTION

Figure 1:
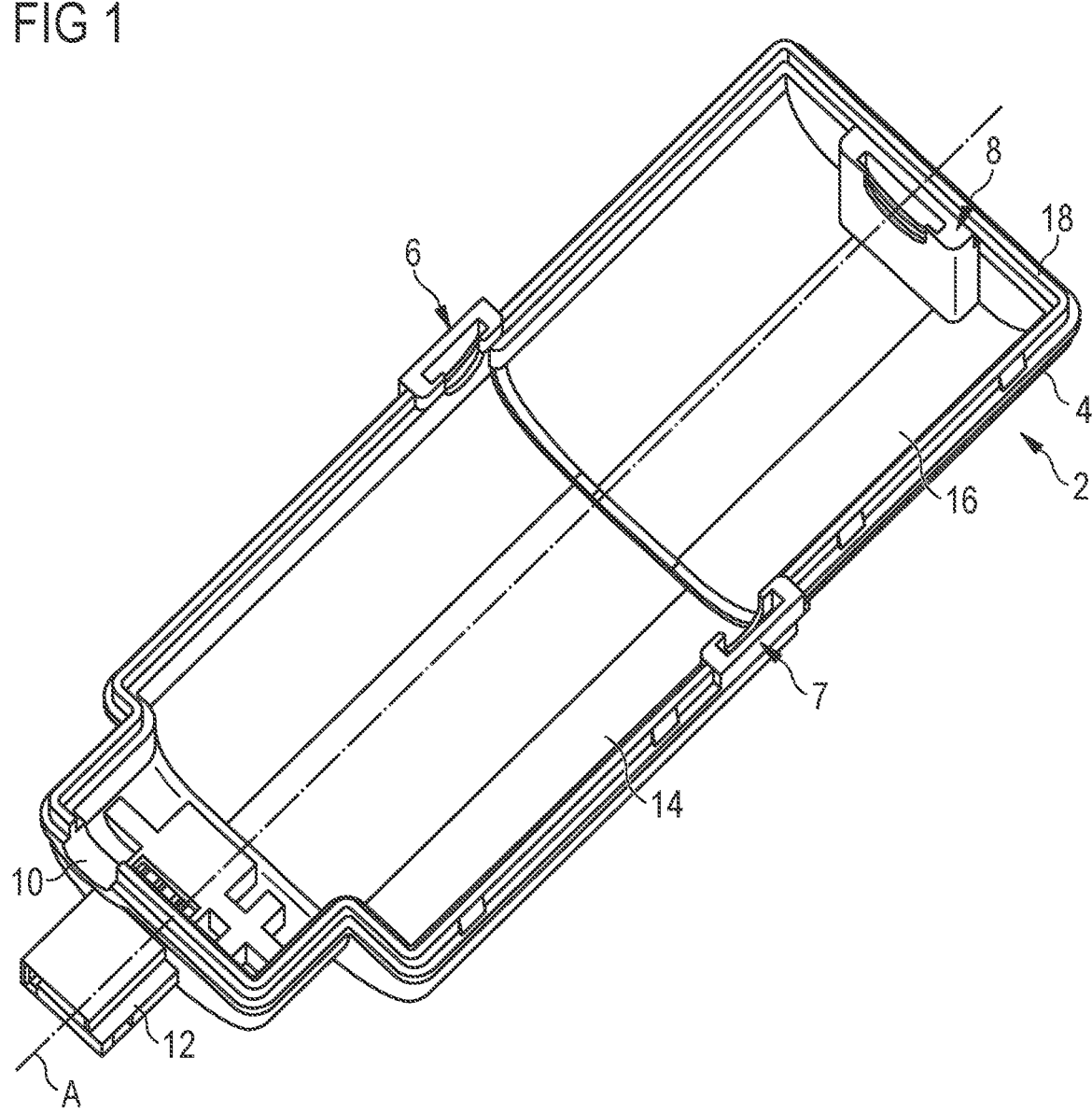
FIG. 1 is an isometric view showing a half shell of a pump housing.

FIG. 1 shows a half shell 4 of a pump housing 2. On a head side, the pump housing 2 has a first passage 10 and a second passage 12. The first passage 10 is designed to execute a pump outlet 34 and the second passage 12 to execute an electrical connection. The first and the second passage 10, 12 are located in the first area 14 of the pump housing 2. The first area 14 of the pump housing 2 is suitable for accommodating the pump unit 32. The second area 16 of the pump housing 2 adjoining the first area 14 is suitable for accommodating a pump motor 30, which is especially attached to the pump unit 32 along the longitudinal axis A. The first area 14 and the second area 16 can especially have a different inner diameter. Here, the pump housing has three pocket-shaped fixing elements 6, 7, 8. The pocket-shaped fixing element 6 and the pocket-shaped fixing element 7 are radially arranged on opposite sides of the housing wall, which is essentially cylindrical here. They are arranged in a middle area of the cylindrical housing wall, arranged in the first area 14 in the design shown here. Alternately, the fixing elements 6 and 7 can also be arranged in the second area 16. The pocket-shaped fixing element 8 is arranged on the side of the pump housing 2 opposite the first and second passage 10, 12 and is located in the area of the longitudinal axis A. In addition, a seal 18 can be circumferentially arranged around the half shell 4.

Figure 2A:
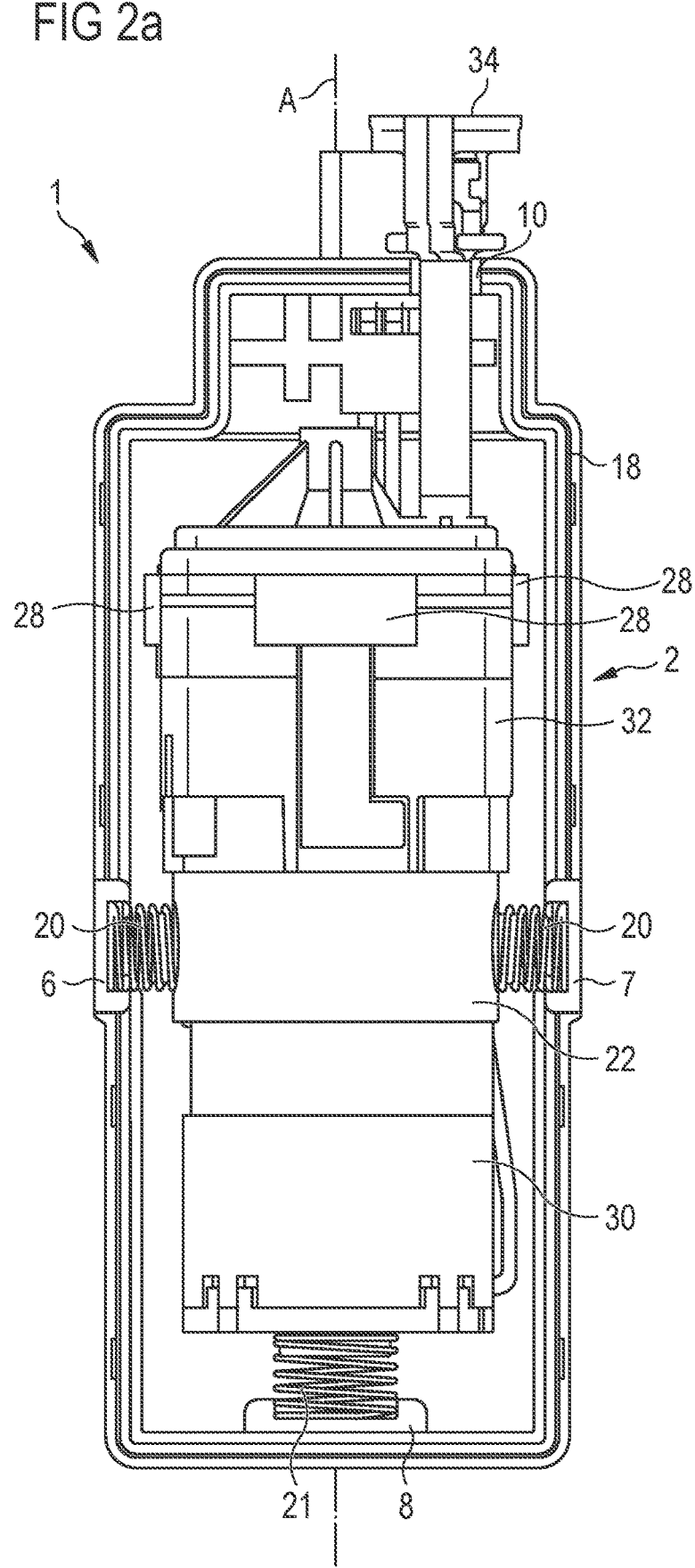
FIGS. 2a and 2b are respectively side and isometric views showing a pump in an opened pump housing.
Figure 2B:
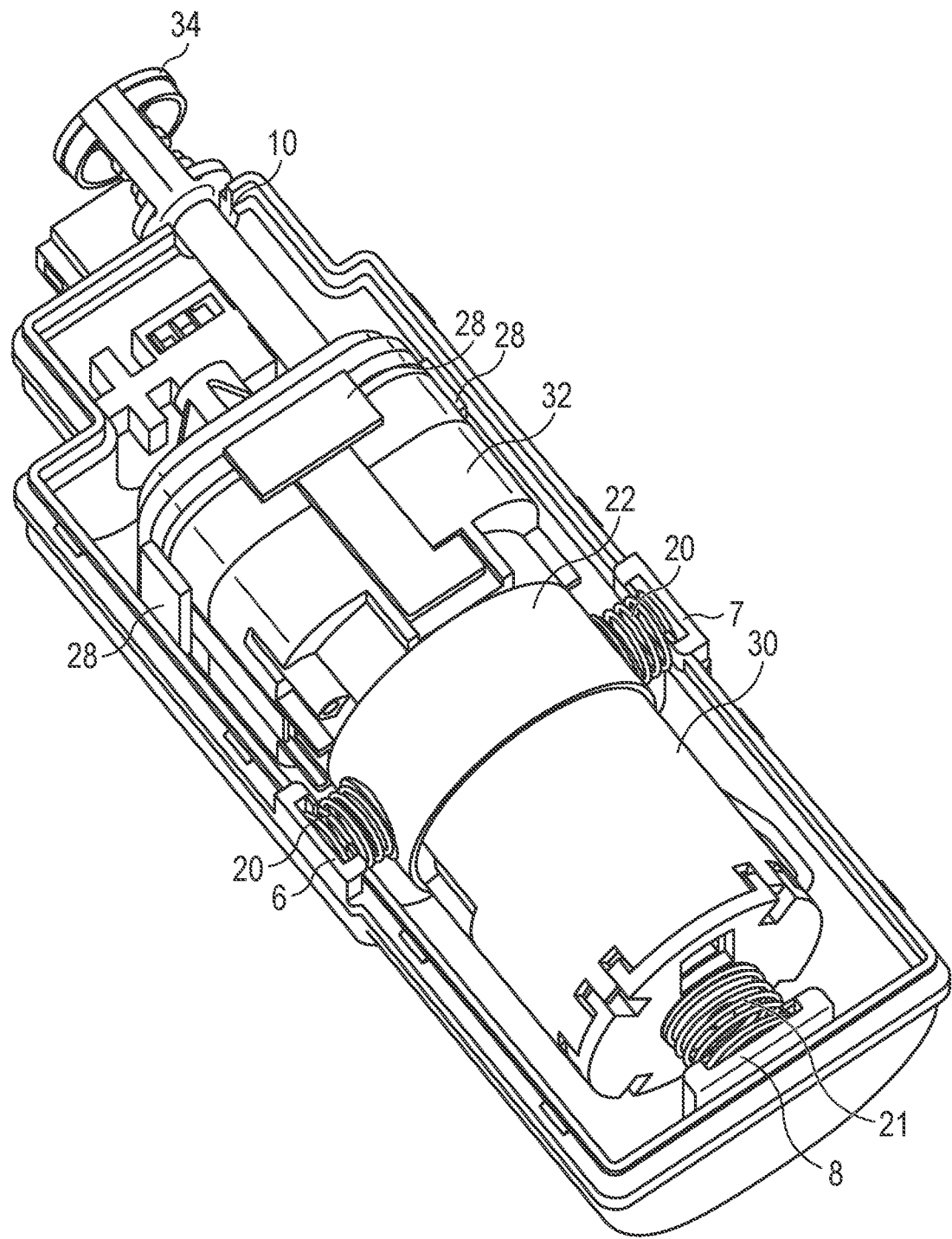

FIGS. 2a and 2b show two views of a pump 1 according to the disclosure that includes a pump housing 2. In contrast to the pump housing 2 shown in FIG. 1, the pocket-shaped fixing elements 6, 7 are arranged in the second area 16. An arrangement of the pocket-shaped fixing elements 6, 7 in the first area 14 is alternately possible as well.

Figure 3:
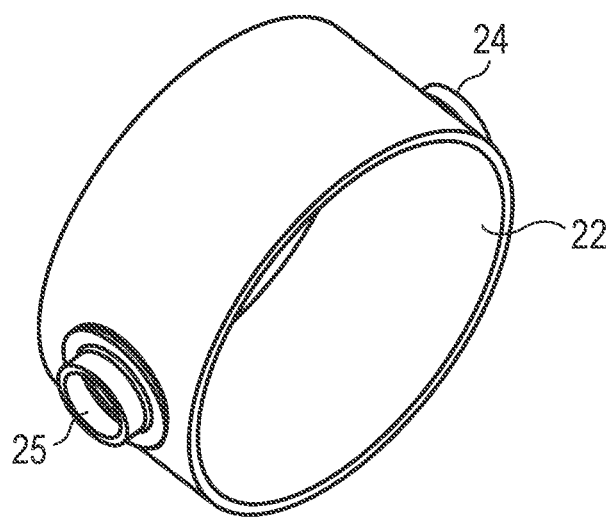
FIG. 3 is an isometric view showing a ring element.

The pump unit 32 is arranged in the first area 14 in such a way that the pump connection 34 is led through the first passage 10. The pump motor 30 is arranged in the second area 16. Around the pump motor 30, a ring element 22 with two protrusions 24, 25 radially opposite one another has been arranged. Such a ring element is shown once more separately in FIG. 3. The protrusions 24, 25 lie in each case opposite the pocket-shaped fixing elements 6, 7. The pocket-shaped fixing elements 6, 7 accommodate in each case an end coil of a first coil spring 20, which encloses the protrusions 24, 25 on the other side. Alternately, several end coils of a first coil spring 20 can also be accommodated in the pocket-shaped fixing elements 6, 7. Furthermore, the pocket-shaped fixing element 21 accommodates the end coil of a second coil spring 21, braced against a protrusion of the pump motor 30. Here, the pocket-shaped fixing element 21 can also accommodate several end coils of the second coil spring 21.

Furthermore, damping elements 28 are arranged on the pump unit 32. In pump 1 according to the disclosed embodiment, four damping elements 28 are arranged in each case in pairs radially opposite one another, although only three of such damping elements 28 are visible in FIGS. 2a and 2b.

Figure 4A:
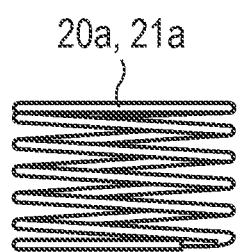
FIGS. 4a and 4b are respectively side and isometric views showing a first coil spring example.
Figure 4B:
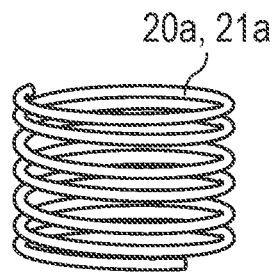
Figure 4C:
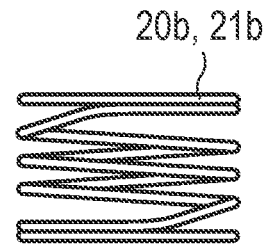
FIGS. 4c and 4d are respectively side and isometric views showing a second coil spring example.
Figure 4D:
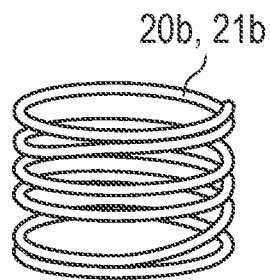
Figure 4E:
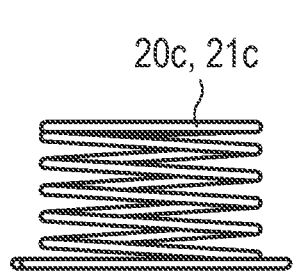
FIGS. 4e and 4f are respectively side and isometric views showing a third coil spring example.
Figure 4F:
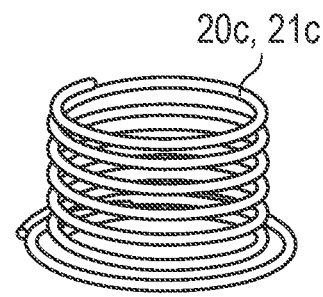

FIGS. 4a and b show a first design of a first or second coil spring 20a, 21a. The coil spring shown is a cylindrical one. FIGS. 4c and d show a second design of a first or second coil spring 20b, 21b in which the coil spring has a flared end coil. FIGS. 4e and f show a third design of a first and second coil spring 20c, 21c in which the coil spring has an enlarged end coil. The coil springs shown can be used as first or second coil spring 20, 21 in the pump 1 according to the disclosure, wherein different designs can be chosen for the first and second coil spring 20, 21.

LIST OF REFERENCE NUMERALS

1 Pump
2 Pump housing
4 Half shell
6 Pocket-shaped fixing element
7 Pocket-shaped fixing element
8 Pocket-shaped fixing element
10 First passage
12 Second passage
14 First area
16 Second area
18 Seal
20, 20a, 20b, 20c First coil spring
21, 21a, 21b, 21c Second coil spring
22 Ring element
24 Protrusion
25 Protrusion
28 Damping element
30 Pump motor
32 Pump unit
34 Pump connection
A Longitudinal axis

The invention claimed is:

1. A pump comprising:
a pump housing;
a pump motor;
a pump unit;
at least two flexible support elements; and
a coil spring;
wherein the pump motor and the pump unit are arranged in the pump housing;
wherein the pump motor and the pump unit are attached to each other along a longitudinal axis to form an assembly;
wherein the at least two flexible support elements include damping elements made of foam configured in the shape of pads or blocks, each damping element being arranged in a respective radial direction with respect to the longitudinal axis between the assembly and the pump housing; and
wherein the coil spring is arranged in compression in an axial direction with respect to the longitudinal axis between the pump motor and the pump housing to support the pump motor.

2. The pump according to claim 1, wherein the pump housing has at least one of cylindrical protrusions for the coil spring and fixing elements to fasten the coil spring.

3. The pump according to claim 2, wherein the fixing elements have a pocket-shaped design.

4. The pump according to claim 1, wherein the housing includes two half shells, the two half shells being configured substantially symmetrical to one another.

5. The pump according to claim 1, wherein the coil spring is selected from a cylindrical coil compression spring, a coil compression spring with exposed end coils, and an exposed coil compression spring with enlarged end coils.

6. The pump according to claim 1, wherein the coil spring is a steel spring.

7. The pump according to claim 1, wherein the pump motor has at least one of cylindrical protrusions for accommodating the coil spring and fixing elements to fasten the coil spring.

8. A seat with a pump according to claim 1.

9. The seat according to claim 8, wherein one or several of the pumps are arranged in a backrest and connected to one of a massage system or a lumbar support system.

10. The pump according to claim 1, wherein the coil spring is a second coil spring, the pump further including a plurality of first coil springs arranged in compression in a radial direction with respect to the longitudinal axis between the assembly and the pump housing.

11. The pump according to claim 1, including four of the damping elements arranged at 90-degree intervals around the longitudinal axis.

12. A pump comprising:
a pump housing;
a pump motor;
a pump unit;
at least two flexible support elements; and
a coil spring;
wherein the pump motor and the pump unit are arranged in the pump housing;
wherein the pump motor and the pump unit are attached to each other along a longitudinal axis to form an assembly;
wherein the at least two flexible support elements include four damping elements made of foam, each damping element being arranged in a respective radial direction with respect to the longitudinal axis between the assembly and the pump housing, the damping elements being arranged at 90-degree intervals around the longitudinal axis; and
wherein the coil spring is arranged in compression in an axial direction with respect to the longitudinal axis between the pump motor and the pump housing to support the pump motor.

\* \* \* \* \*